United States Patent [19]
Oishi et al.

[11] 3,931,527
[45] Jan. 6, 1976

[54] IGNITION CIRCUIT FOR VEHICLE OCCUPANT PROTECTING SYSTEM

[75] Inventors: Kazuo Oishi, Oobu; Hideaki Sasaya; Akihiro Kobayashi, both of Aichi; Takashi Yamada, Anjo, all of Japan

[73] Assignee: Nippon Soken, Inc., Nishio, Japan

[22] Filed: July 5, 1974

[21] Appl. No.: 485,999

[30] Foreign Application Priority Data
July 6, 1973  Japan.................................. 48-76771

[52] U.S. Cl........ 307/10 R; 280/150 AB; 340/52 H
[51] Int. Cl.$^2$...................................... H01H 35/14
[58] Field of Search.................. 307/10 R; 317/9 B; 340/262, 52 H; 200/61.45 R, 61.45 M, 61.44, 61.53; 180/103, 104; 280/150 AB

[56] References Cited
UNITED STATES PATENTS
3,622,974  11/1971  Best et al............................ 280/150
3,720,915  3/1973  Hass................................. 340/52 H Primary Examiner—James R. Scott
Assistant Examiner—M. Ginsburg
Attorney, Agent, or Firm—Cushman, Darby and Cushman

[57] ABSTRACT

There is provided an ignition circuit for a vehicle occupant protecting system whereby in case of a collision a heating element such as a filament is ignited to actuate the occupant protecting system. Switch means is connected in parallel with the heating element and another switch means is connected in series with the parallel circuit of the heating element and the first switch means, whereby when at least one of said switch means is damaged, the ignition of the filament is rendered impossible.

10 Claims, 6 Drawing Figures

IGNITION CIRCUIT FOR VEHICLE OCCUPANT PROTECTING SYSTEM

BACKGROUND OF THE INVENTION

1. Field of the Invention

The present invention relates to an ignition circuit for vehicle occupant protecting system which is used for actuating a vehicle occupant protecting system such as a gas bag system.

2. Description of the Prior Art

Ignition circuits for vehicle occupant protecting systems are known in the art in which in response to the output signal of a collision detecting sensor for detecting a collision, a heating element such as a filament is ignited through a single switch means to actuate the detonator of a gas bag.

A disadvantage of this type of ignition circuit is that if the final stage switch for igniting a filament is broken down, there is a substantial danger of causing the filament to be ignited and thus causing the gas bag to operate spontaneously. Particularly, where the switch means comprises contactless switch means which consists of a semiconductor element which is connected in series with a filament, there is involved a very great danger in consideration of the fact that most of such semiconductor elements tned to conduct current when they are broken.

In the other hand, where the switch means consists of the contacts of a mechanical switch such as an acceleration/deceleration sensor switch, there is also similar danger of the gas bag operating erroneously when the switch means is exposed to harmful environments, such as sea water or atmosphere containing salt, which causes the contacts to become faulty and remain in the conductive state.

SUMMARY OF THE INVENTION

It is an object of the present invention to provide an ignition circuit for a vehicle occupant protecting system in which switch means is connected in parallel with a filament and another switch means is connected in series with the filament whereby when either one of the two switch means is damaged the ignition of the filament is prevented and which is thus capable of operating with a very high degree of safety.

The ignition circuit according to the present invention has among its great advantages the fact that it is capable of preventing the supply of current to a heating element even when switch means is damaged and left in the conducting state and thus preventing a vehicle occupant protecting system such as a gas bag system from being actuated erroneously by the operation of the ignition circuit other than in collisions of the vehicle.

Another great advantage of the circuit of this invention is the use of a fault detecting circuit by which when either one of the two switch means becomes faulty, the fault is detected to generate a fault detection signal and fault warning means for giving warning upon occurrence of a fault detection signal, whereby the occurrence of a fault in the ignition circuit for the vehicle occupant protecting system can be immediately conveyed to the occupants to prevent the danger of the vehicle from being driven by the driver without any knowledge of the fault in the ignition circuit and thus running into any trouble.

Still another great advantage of the circuit of this invention is the use of a fault detecting circuit by which when either one of the two switch means becomes faulty, the fault is detected to generate a fault detection signal and heating element power supply stopping means for interrupting an ignition power supply path to a heating element upon ocurrence of a fault detection signal, whereby when the ignition circuit for the vehicle occupant protecting system is left in the fault condition, this hardly gives rise to a dangerous situation in which for some reason or other the fault condition of the ignition circuit gives rise to an erroneous ignition causing a sudden explosion of an occupant protecting system such as a gas bag system.

DESCRIPTION OF THE PREFERRED EMBODIMENT

The present invention will now be described in greater detail with reference to the illustrated embodiment.

Figure 1:
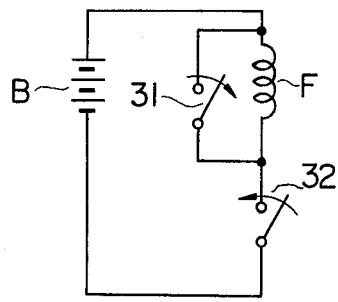
FIG. 1 is a schematic wiring diagram for explaining the principle of the present invention.

In FIG. 1 showing a schematic diagram which is useful for explaining the principle of the invention, symbol B designates a power source, F a gas bag igniting filament as a heating element, 31a first switch means, and 32a second switch means. To inflate the gas bag, the first switch means 31 is switched to its nonconductive state and the second switch means 32 is switched to its conductive state. In other words, if the second switch means 32 is damaged and thus held on or conductive under the conditions where the operation of the occupant protecting system is not required, the first switch means 31 remains in its conductive state. As a result, the current from the power source B flows through the first and second switch means 31 and 32 amd hence the filament F is not ignited. Similary, if the first switch means 31 is damaged and thus held conductive, the ignition of the filament F is also prevented. Further, if the second switch means 32 is damaged and thus held off or nonconductive, the ignition of the filament F is of course prevented.

Figure 4:
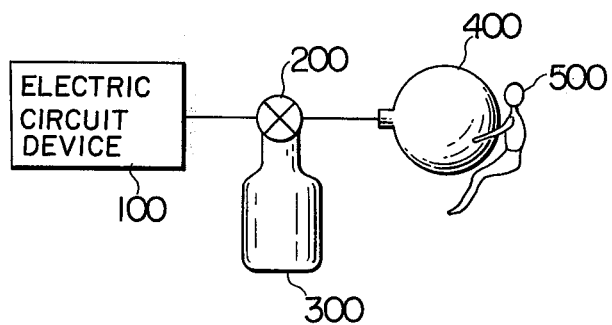
FIG. 4 is a block diagram of a gas bag system.

In FIG. 4, there is illustrated a gas bag system which is a kind of vehicle occupant protecting system. In FIG. 4, numeral 100 designates an electric circuit device for detecting a collision and generating a valve operating command. The electric circuit device 100 is identical with the ignition circuit for occupant protecting system shown in FIG. 2 except that the filament F is eliminated. Numeral 200 designates a valve operating mechanism comprising a detonator having the filament F and means for breaking a sealing plate and opening a valve, 300 a cylinder containing gas under pressure, 400 a gas bag for protecting vehicle occupants, and 500 an occupant to be protected.

Figure 2:
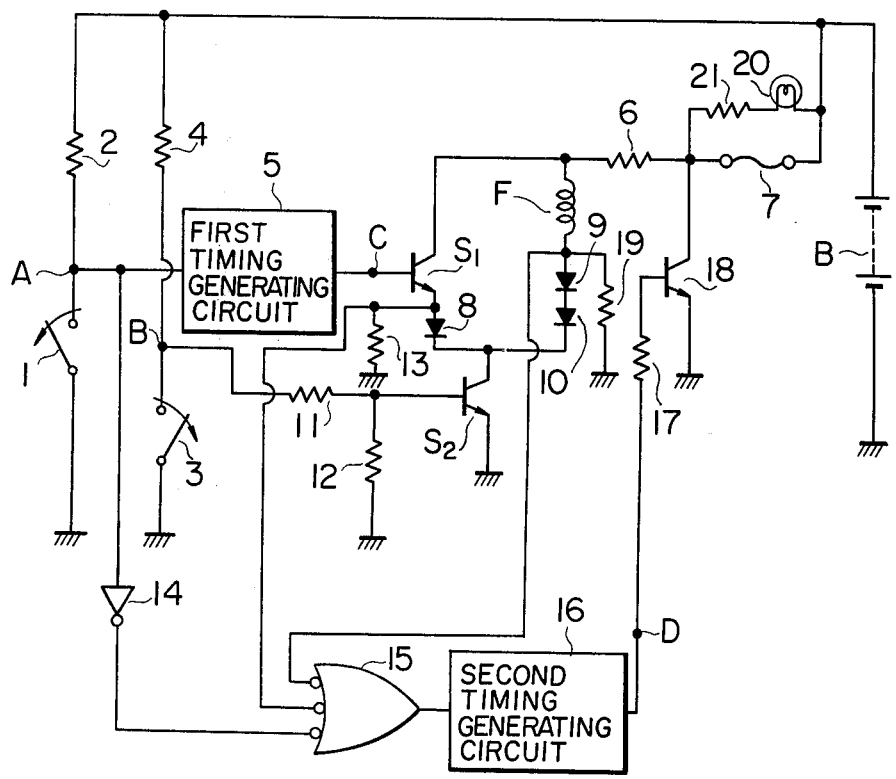
FIG. 2 is a wiring diagram showing an embodiment of an ignition circuit for the vehicle occupant protecting system according to the present invention.

In FIG. 2 illustrating a circuit diagram of the entire ignition circuit for the occupant protecting system according to the invention, numeral 1 designates a first sensor switch for detecting a collision which may, for example, be an acceleration/deceleration sensor for sensing the deceleration in case of a collision. Numeral 2 designates a resistor for supplying a bias current to the first sensor switch 1, 3 a second sensor switch for detecting a collision, 4 a resistor for supplying a bias current to the second sensor switch 3, 5 a first timing generating circuit for introducing a time interval, 6 a current limiting resistor for the filament F, and 7 a fuse constituting heating element power supply stopping means. Numeral 8 designates a current circuit separating diode, 9 and 10 voltage drop compensating diodes, 11 a current limiting resistor, and 12 a bias resistor connected across the base and emitter of a transistor $S_2$ to prevent the transistor $S_2$ from being turned on by a temperature rise. Numeral 13 designates a current detecting resistor for the transistor $S_1$, 14 an inverter, 15 a NAND element, 16 a second timing generating circuit, 17 a current limiting resistor, and 18 a fuse melting transistor constituting, along with the second timing generating circuit 16 and the NAND element 15, a fault detecting circuit. Numeral 19 designates a filament burn-out detecting resistor, 20 a lamp constituting a fault warning device, 21 a current limiting resistor. The transistor $S_1$ constituting a first switch means is connected in parallel with the filament F constituting the heating element, and the transistor $S_2$ constituting a second switch means is connected in series with the parallel circuit of the transistor $S_1$ and the filament F.

As will be apparent from the foregoing, the transistors $S_1$ and $S_2$ correspond respectively to the first and second switch means 31, 32 in FIG. 1, and further the filament F corresponds to the gas bag igniting filament F in FIG. 1.

Figure 3:
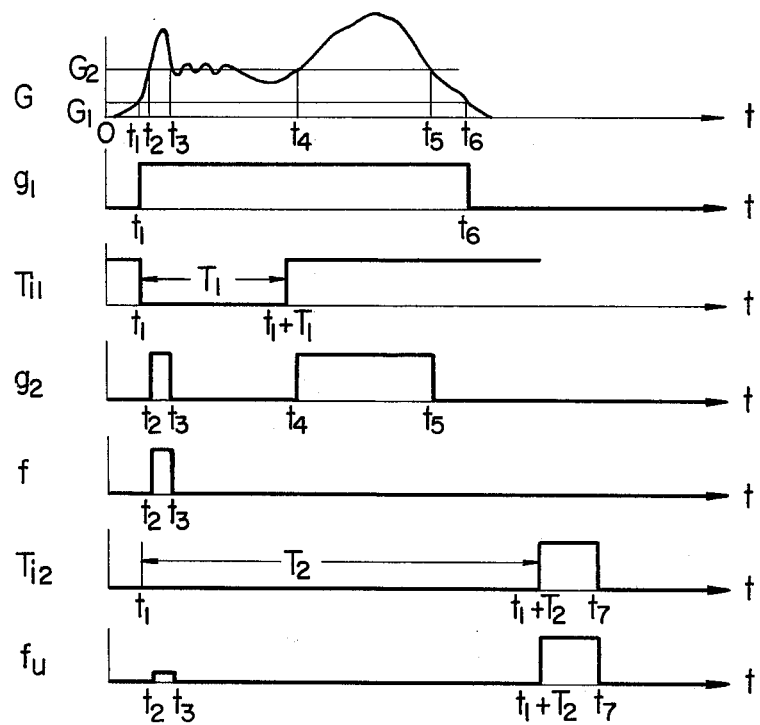
FIG. 3 is a wave form diagram showing the voltage waveforms generated at various points in the ignition circuit of FIG. 2 for explaining the operation thereof.

With the construction described above, the ignition circuit for the occupant protecting system according to the invention operates as follows. In FIG. 3 showing a waveform diagram for explaining the operating conditions of the ignition circuit during a collision, symbol $t$ designates time, G the deceleration in a collision, $g_1$ the voltage waveform generated at one end A of the first sensor switch 1, $g_2$ is the voltage waveform generated at one end B of the second sensor switch 3, $T_{t1}$ the voltage waveform generated at an output terminal C of the first timing generating circuit 5, $f$ the waveform of current flowing through the filament F, $T_{t2}$ the output waveform generated at an output terminal D of the second timing generating circuit 16, and fu the current flowing through the fuse 7.

When, at the time $t = t_1$, the deceleration due to a collision exceeds a level $G_1$ shown in FIG. 3, the sensor switch 1 is opened. When this occurs, the output of the first timing generating circuit 5 goes to a low level for a predetermined time $T_1$ (the low level is hereinafter referred to as an "L" level and the high level as an "H" level). Consequently, the transistor $S_1$ is turned off and thus the ignition circuit becomes to be in condition to supply current to the filament F. When, at $t = t_2$, the deceleration becomes greater than a predetermined second deceleration level $G_2$, the second sensor switch 3 is opened. When this happens, the transistor $S_2$ is instantly turned on and the current from the power source B flows through the fuse 7, the resistor 6, the filament F, the diodes 9 and 10 and the transistor $S_2$ to ignite the filament F. Consequently, the detonator in the valve operating mechanism for the gas bag is ignited and thus the gas in the cylinder is introduced into the gas bag to inflate it and protect the occupant.

Under normal driving conditions, it is very dangerous to allow the gas bag to inflate by any erroneous ignition. The ignition circuit of this invention is capable of preventing the occupant protecting system from coming into operation erroneously under normal driving conditions and exposing the occupants to danger.

With the ignition circuit according to the present invention, when there is at least any one of the faults resulting in (1) the opening of the first sensor switch 1, (2) the turning off of the transistor $S_1$, (3) the opening of the second sensor switch 3, (4) the turning on of the transistor $S_2$, and (5) the burning out of the filament F, the power supply path to the filament F is interrupted and simultaneously the occupants are warned of the fault.

In other words, when at least any one of the above-mentioned fault conditions (1)–(5) occurs, the output of the NAND element 15 goes to the H level. If the output of the NAND element 15 remains at the H level even after the expiration of a predetermined time $T_2$, the output of the second timing generating circuit 16 goes to the H level as shown in FIG. 3-$T_{t2}$ and this H level output causes the fuse melting transistor 18 to become conductive to burn out the fuse 7. FIG. 3-$fu$ shows the waveform of the current through the fuse 7. When the fuse 7 is burnt out, current flows to the lamp 20 and the lamp 20 is lighted to warn the occupants of the occurrence of the fault in the ignition circuit for occupant protecting system. While, in FIG. 3-$T_{t2}$, the predetermined time $T_2$ begins at the operating time $t_1$ of the first sensor switch 1, this is only for the purpose of the following description of the second timing generating circuit 16 when the ignition circuit for occupant protecting system operates normally. Thus, the predetermined time $T_2$ begins at the instant that the output of the NAND element 15 goes to the H level after the occurrence of a fault. As mentioned earlier, the output of the NAND element 15 goes to the H level when the ignition circuit for occupant protecting system comes into operation normally. However, since the predetermined time $T_2$ is sufficiently greater than the time required for the gas bag to complete its operation, the filament F is ignited to inflate the gas bag, after which the fuse 7 is melted. consequently, during the normal operation of the ignition circuit, the fault detecting circuit has the function of extinguishing the filament 7 after the actuation of the gas bag, and therefore it is useful in preventing the occurrence of a fire and it has no detrimental effect on the normal functioning of the ignition circuit.

Figure 5:
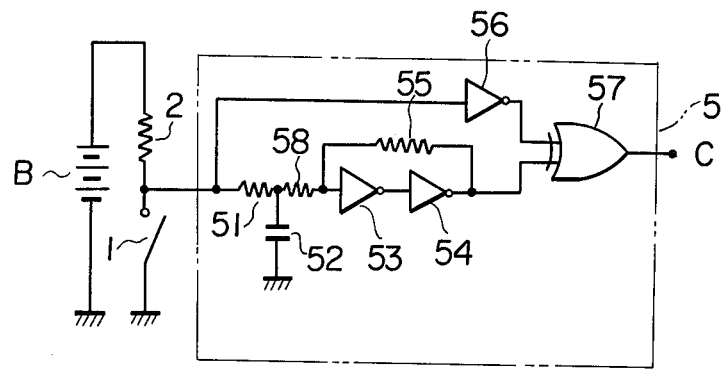
FIG. 5 is a wiring diagram showing the first timing generating circuit used in the ignition circuit of FIG. 2.

Referring now to FIG. 5 illustrating the first timing generating circuit 5 in detail, numeral 51 designates a timing generating resistor, 52 a timing generating capacitor. The predetermined time $T_1$ is determined by the time constant of the resistor 51 and the capacitor 52. Numerals 53 and 54 designate inverters constituting, along with resistors 55 and 58, a Schmitt circuit. Numeral 56 designates an inverter, 57 an EXCLUSIVE OR element whereby only when its two input signals are different from each other, an H level signal is generated at a point C.

Figure 6:
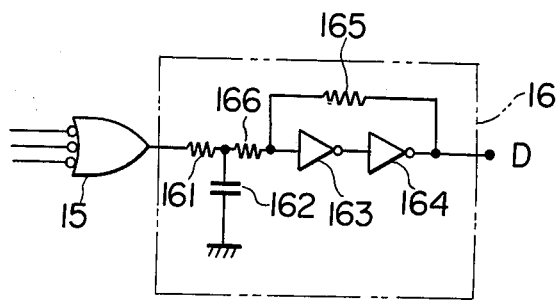
FIG. 6 is a wiring diagram showing the second timing generating circuit used in the ignition circuit of FIG. 2.

FIG. 6 illustrates the second timing generating circuit 16 in detail, and its predetermined time $T_2$ is determined by the time constant of a resistor 161 and a capacitor 162. Numerals 163 and 164 designate inverters constituting, along with resistors 165 and 166, a Schmitt circuit. The point C in FIG. 5 and the point D in FIG. 6 respectively show the points C and D in FIG. 2.

While, in the embodiment of the invention described above, the contactless switch means each comprising a transistor are used, mechanical contact type switch means with contacts may be substituted for the contactless switch means. In this case, since contact type switch means of the like construction usually show the same fault mode if they are arranged close to each other, the similar effect to that expected for the contactless switch means of the present invention can be fully expected. In addition to transistors, the contactless switch means may be thyristors, for example.

We claim:

1. An ignition circuit for a vehicle occupant protecting system comprising:
    a heating element for actuating by the action of heat generation thereof an occupant protecting system installed in a vehicle;
    first normally closed switch means connected in parallel with said heating element and adapted to open in response to a collision of a vehicle;
    second normally open switch means connected in series with a parallel circuit of said heating element and said first switch means, means for closing said second switch means in response to a collision of said vehicle, and
    a power source for supplying electric power to said heating element through said second normally open switch means upon the closing thereof when a collision occurs.

2. An ignition circuit according to claim 1, wherein each of said first and second switch means comprise contact type switch means.

3. An ignition circuit according to claim 1, wherein each of said first and second switch means comprise contactless type switch means.

4. An ignition circuit according to claim 1, wherein said heating element is a filament.

5. An ignition circuit according to claim 2, wherein said heating element comprises a filament.

6. An ignition circuit according to claim 3, wherein said heating element comprises a filament.

7. An ignition circuit according to claim 6, wherein said contactless type switch means comprises a transistor.

8. An ignition circuit according to claim 1 further comprising:
    a fault detecting circuit for detecting a fault in at least either one of said first and second switch means and for generating a fault detection signal, and
    fault warning means connected to said fault detecting circuit for giving a warning in response to said fault detection signal from said fault detecting circuit.

9. An ignition circuit according to claim 1 further comprising:
    a fault detecting circuit for detecting a fault in at least either one of said first and second switch means and for generating a fault detection signal, and
    heating element power supply stopping means connected to said fault detecting circuit for interrupting an igniting power supply path to said heating element in response to said fault detection signal from said fault detecting circuit.

10. An ignition circuit according to claim 8 further comprising:
    heating element power supply stopping means for interrupting an igniting power supply path to said heating element in response to said fault detection signal from said fault detecting circuit.

* * * * *